(12) United States Patent
Gatton

(10) Patent No.: US 7,185,573 B1
(45) Date of Patent: Mar. 6, 2007

(54) VACUUM WHEEL CHUCK

(75) Inventor: Geoffrey L. Gatton, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 13 days.

(21) Appl. No.: 11/060,953

(22) Filed: Feb. 18, 2005

(51) Int. Cl.
  *B23B 31/02* (2006.01)
(52) U.S. Cl. ............................ 82/104; 82/901; 409/137
(58) Field of Classification Search ................ 82/901, 82/104, 142–147; 408/67; 409/137; 29/DIG. 50, 29/DIG. 78, DIG. 79, DIG. 84
  See application file for complete search history.

(56) References Cited

U.S. PATENT DOCUMENTS

| | | | | |
|---|---|---|---|---|
| 3,125,912 A | * | 3/1964 | Lawalin | 82/117 |
| 3,145,997 A | * | 8/1964 | Moses | 279/2.16 |
| 3,845,962 A | * | 11/1974 | Molin | 279/4.04 |
| 4,034,786 A | | 7/1977 | Feldmann et al. | |
| 4,036,308 A | * | 7/1977 | Dellenberg | 173/75 |
| 4,409,811 A | | 10/1983 | Bosch | |
| 4,580,471 A | * | 4/1986 | Oyama et al. | 82/146 |
| 5,062,330 A | * | 11/1991 | Trautmann et al. | 82/147 |
| 5,213,019 A | * | 5/1993 | Carlyle et al. | 82/142 |
| 5,332,341 A | * | 7/1994 | Arai et al. | 408/61 |
| 5,356,245 A | * | 10/1994 | Hosoi et al. | 408/56 |
| 5,441,284 A | | 8/1995 | Mueller et al. | |
| 5,562,007 A | | 10/1996 | Seymour | |
| 5,779,402 A | * | 7/1998 | Kameda | 408/56 |
| 5,820,137 A | * | 10/1998 | Patterson | 279/141 |
| 6,036,412 A | * | 3/2000 | Dalla | 409/136 |
| 6,095,391 A | * | 8/2000 | Fiske et al. | 226/42 |
| 6,126,174 A | | 10/2000 | Reece et al. | |
| 6,862,785 B2 | | 3/2005 | Baumgartner | |
| 6,916,026 B2 | * | 7/2005 | Meza | 279/110 |

FOREIGN PATENT DOCUMENTS

| | | | |
|---|---|---|---|
| JP | 56027705 A | * | 3/1981 |
| JP | 09066409 A | * | 3/1997 |
| JP | 11090762 A | * | 4/1999 |

* cited by examiner

*Primary Examiner*—Monica Carter
*Assistant Examiner*—Sara Addisu
(74) *Attorney, Agent, or Firm*—MacMillian, Sobanski & Todd, LLC

(57) ABSTRACT

A wheel chuck assembly includes a support plate having at least one aperture formed therethrough. The support plate is adapted to be mounted upon a lathe spindle. An air conveying device is mounted adjacent to the support plate and is operable to induce an air flow through the support plate aperture such that metal chips are drawn through the support plate aperture.

18 Claims, 7 Drawing Sheets

(Prior Art)

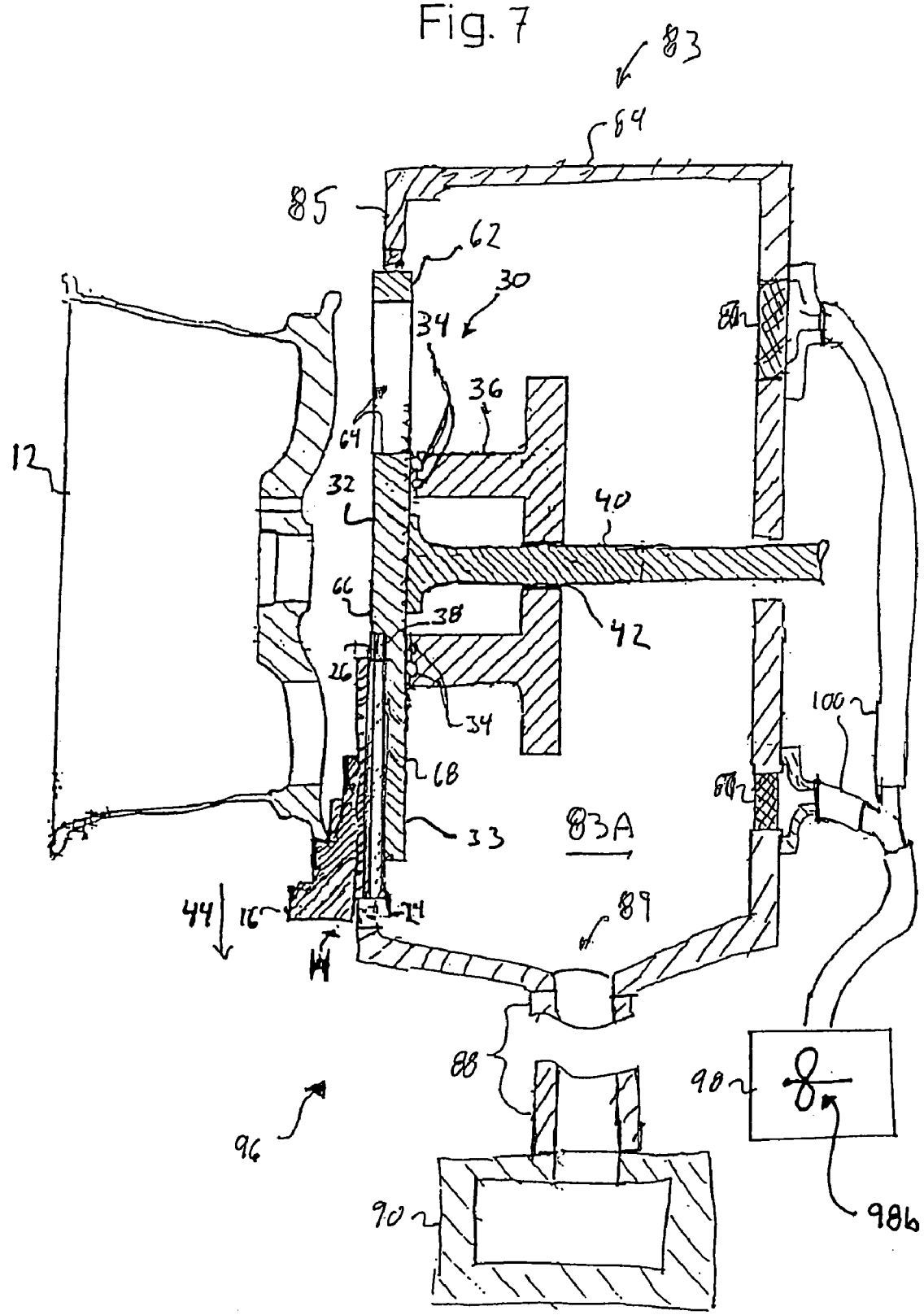

VACUUM WHEEL CHUCK

BACKGROUND OF THE INVENTION

This invention relates in general to wheel chuck assemblies.

Light weight alloy vehicle wheels are becoming increasingly popular. Such wheels typically include an annular wheel rim that carries a tire. A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub.

One conventional process for manufacturing light weight alloy wheels involves pouring molten metal into a wheel mold to form a casting of a one-piece wheel. After the molten metal solidifies, the wheel casting is removed from the mold. The wheel casting is oversized and is machined to a final shape. Alternately, a full face wheel disc that includes the outboard tire bead retaining flange is cast from a light weight alloy and machined to final shape. A partial wheel rim that can be rolled from a strip of steel is then welded to an inboard surface of the wheel disc to form a two piece wheel. Such a wheel combines the low cost and strength of a steel rim with a pleasing aesthetic appearance of a wheel disc cast from a light weight metal and is usually referred to as a bimetal wheel.

Machining the wheel or wheel disc casting typically includes multiple operations. Sawing machines cut any casting gates and risers from the casting. A drilling machine is used to drill the wheel mounting holes through the wheel hub. The wheel casting is then mounted upon a wheel lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. The central pilot hole is usually drilled while the casting is clamped in the lathe for turning the inboard tire bead seat.

Referring now to the drawings, there is shown generally at 10 in FIGS. 1 and 2 a prior art wheel chuck. The known chuck 10 is suitable for clamping a wheel casting (not shown) or vehicle wheel 12 (as shown in FIG. 2) upon a wheel lathe (not shown). The chuck 10 includes a plurality of jaws 14. While three jaws 14 are shown in FIG. 1, the chuck 10 also may have any suitable number of jaws. As best seen in FIG. 2, each jaw 14 includes a stepped portion 16 that includes a plurality of arcuate shaped clamping surfaces labeled 18, 20, and 22, having different radii. The stepped portion 16 is carried upon the upper surface of a wedge shaped actuator plate 24 and is attached thereto by threaded fasteners 28. Alternatively, the stepped portion 16 and the respective actuator plate 24 may be formed integrally as a one-piece jaw (not shown). A guide rib 26 extends from the lower surface of each actuator plate 24 in a radial direction from the center of the chuck 10. The guide rib 26 is typically formed having an inverted T cross sectional shape.

The actuator plates 24 are moveably mounted upon a support structure, indicated generally at 30 in FIG. 2. The support structure 30 includes a circular support plate 31 that is rotatably supported by bearings 34 upon a cylindrical riser 36. The support plate 31 has a first face 32 and a second face 33 that faces the riser 36. A plurality of radial slots 38 having an inverted T cross sectional shape are formed in the first face 32 of the support plate 31 A guide rib 26 having a cross sectional shape that mirrors the support plate radial slots 38 is formed on the surface of each actuator plate that is adjacent to the support plate 31. Each of the support plate radial slots 38 slidably receives a corresponding actuator plate guide rib 26 and cooperates with the rib to retain the actuator plate 24 upon the support plate 31 while guiding the actuator plate for movement in a radial direction. The face place 32 is drivingly coupled to a rotatable lathe spindle 40 that passes through a central riser aperture 42 formed through a riser back plate 43.

Prior to mounting of the vehicle wheel 12 upon the chuck 10 for machining operations, at least one of the jaws 14 is moved in an outward radial direction, as generally indicated by the arrow labeled 44 in FIG. 2, to an open position. The movement is accomplished by urging the corresponding guide rib 26 outward within its respective face plate slot 38 by a conventional hydraulic ram or a mechanical mechanism (not shown). Typically, all of the jaws 14 are simultaneously moved outward. Once the jaws 14 are opened, the wheel 12 is placed upon an appropriate step, such as step 20. The chuck 10 can accommodate wheels of different diameters (not shown) that would be placed upon steps 18 and 22, respectively. The jaws 14 are then moved in a radial inward direction to a closed position, as indicated by the arrow labeled 44A, clamping the wheel 12 within the chuck 10.

The jaws 14, the actuator plates 24, and the conventional hydraulic ram or the mechanical mechanism operate as a clamping mechanism for the chuck 10. However, other chuck clamping mechanisms are generally known, such as an arrangement of a yoke plate, guide pins, and locking arm.

During machining of the vehicle wheel 12, the lathe spindle 40 rotates the chuck 10 and the wheel 12, as indicated in FIG. 1 by an arrow labeled 46, while a tool (not shown) is pressed against a surface of the wheel. The tool cuts into the wheel surface to remove small pieces, or chips, of metal. Because or the rotation of the wheel 12 and the wheel chuck 10, the metal chips cut from the wheel 12 are thrown from the wheel and tend to strike the first face 32 of the support plate 31 and ricochet, or bounce back, toward the wheel. This action is often referred to as "chip whip". The ricocheting chips may strike, or hit, the face of the wheel 12 that is adjacent to the first face 32 of the support plate 31 and may damage or mar the wheel face surface. Typical damage from whip chip may include, for example, scratching painted wheel surfaces, blemishing or scuffing finished wheel surfaces, or generally nicking or marring the wheel surface. Thus, it would be desirable to provide a wheel chuck assembly that would reduce the possible damage caused by whip chip.

BRIEF SUMMARY OF THE INVENTION

This invention relates to in general to wheel chuck assemblies and in particular to a wheel chuck assembly with an air conveying device.

The present invention contemplates a wheel chuck assembly that is adapted to be mounted upon a lathe spindle and includes a support plate having a first face and a second face opposite from the first face. The support plate also has at least one aperture formed therethrough. A clamping mechanism is mounted upon the support plate that is operable to clamp a vehicle wheel adjacent to the first face of the support plate. An air conveying device is mounted adjacent to the support plate second face. The air conveying device is operable to induce an air flow through the support plate aperture such that metal chips are drawn away from the support plate first face and through the support plate aperture.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is a sectional view of an additional alternate embodiment of the wheel chuck assembly shown in FIG. 4.

DETAILED DESCRIPTION OF THE PREFERRED EMBODIMENT

Figure 1:
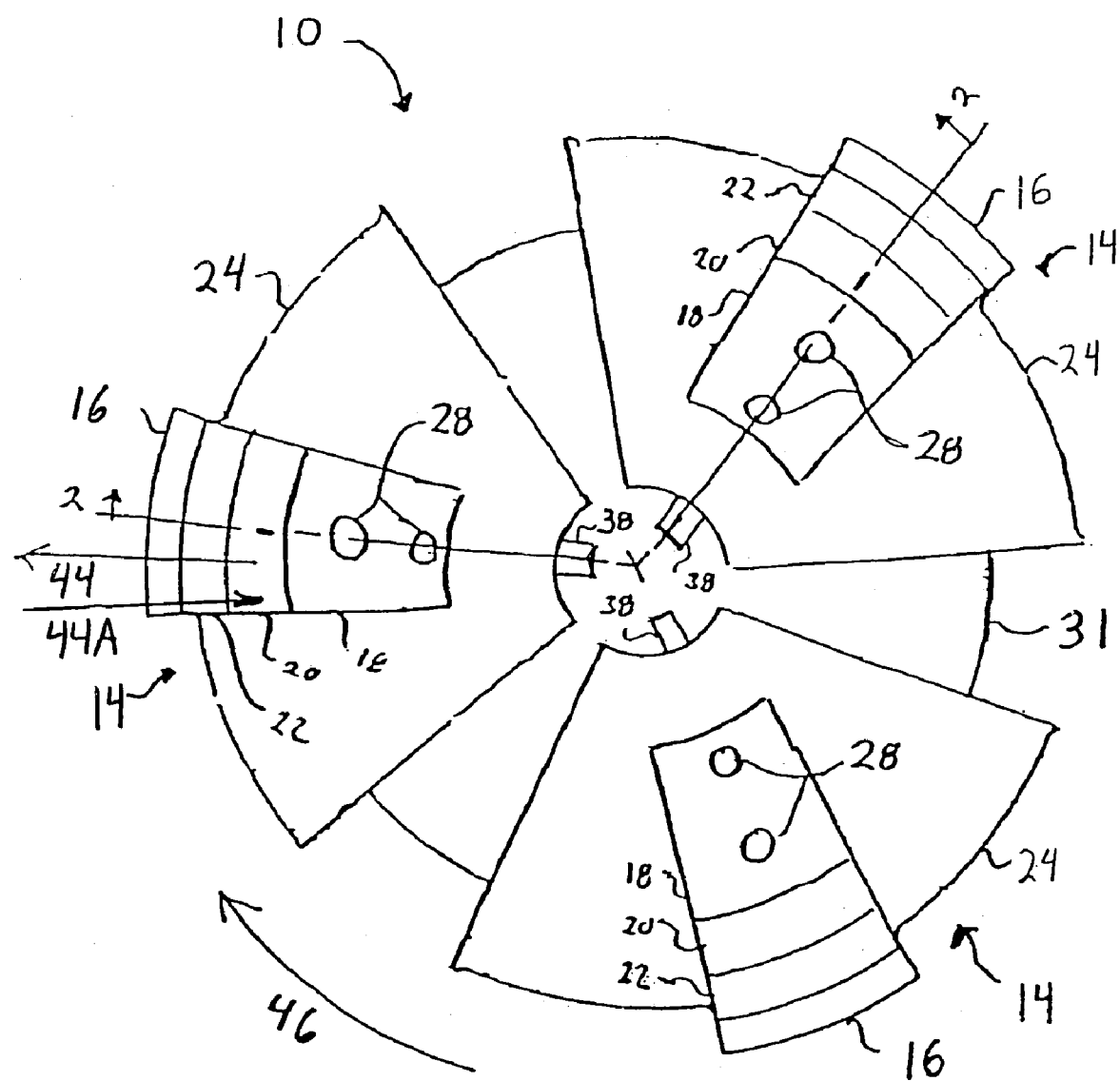
FIG. 1 is an end view of a know wheel chuck assembly.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 2:
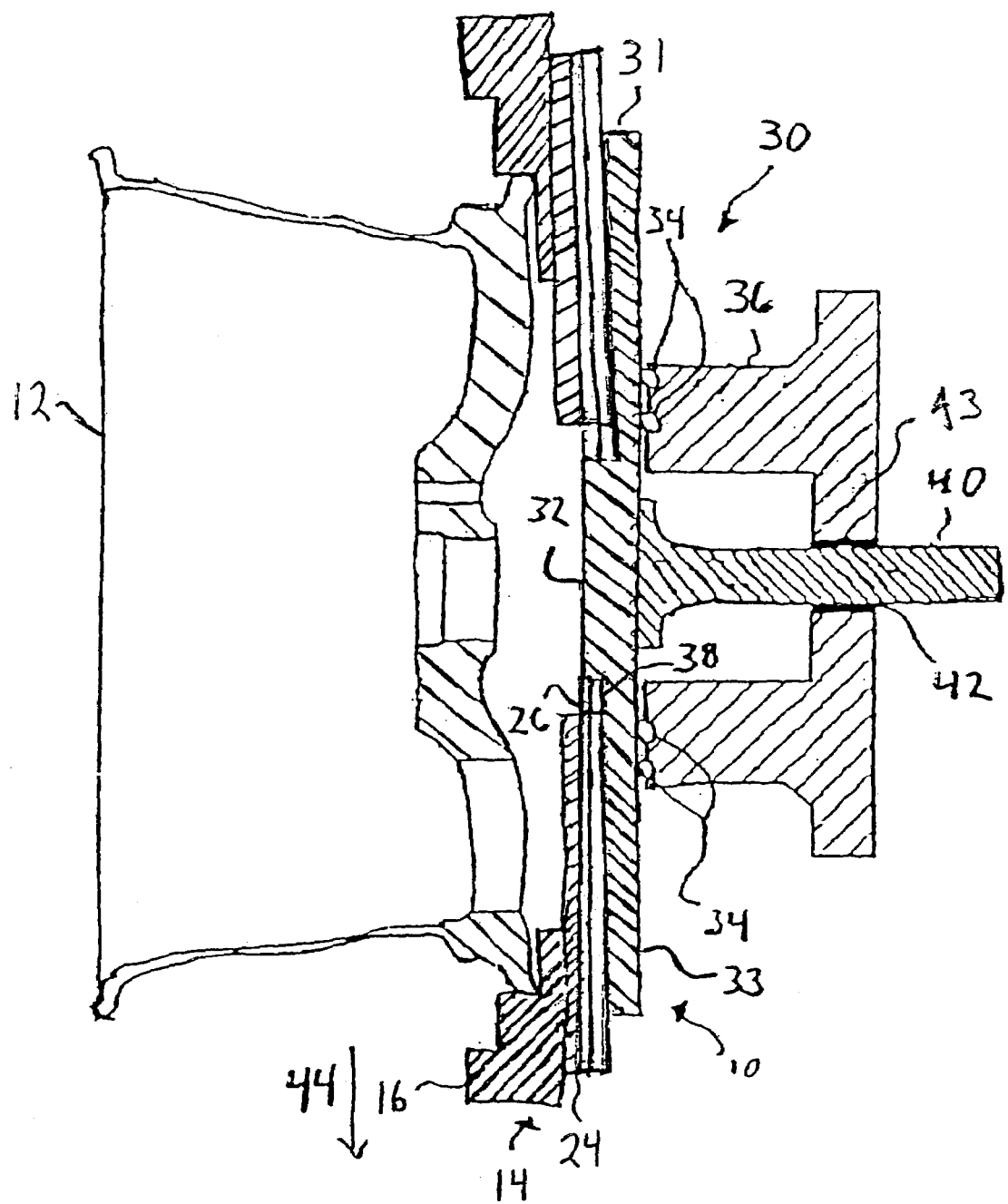
FIG. 2 is a sectional view of the wheel chuck assembly shown in FIG. 1 taken along the line 2—2.
Figure 3:
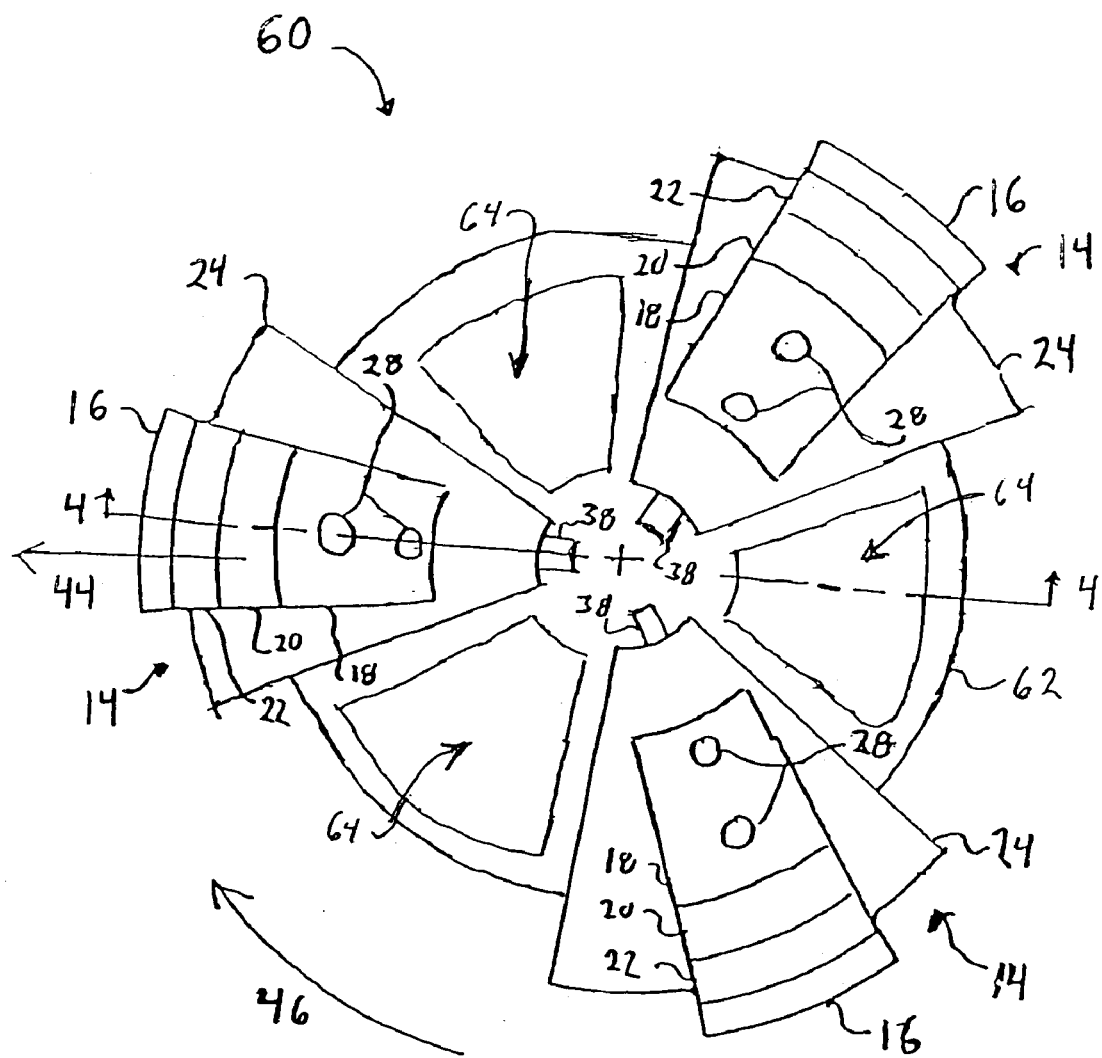
FIG. 3 is an end view of a wheel chuck assembly in accordance with the present invention.
Figure 4:
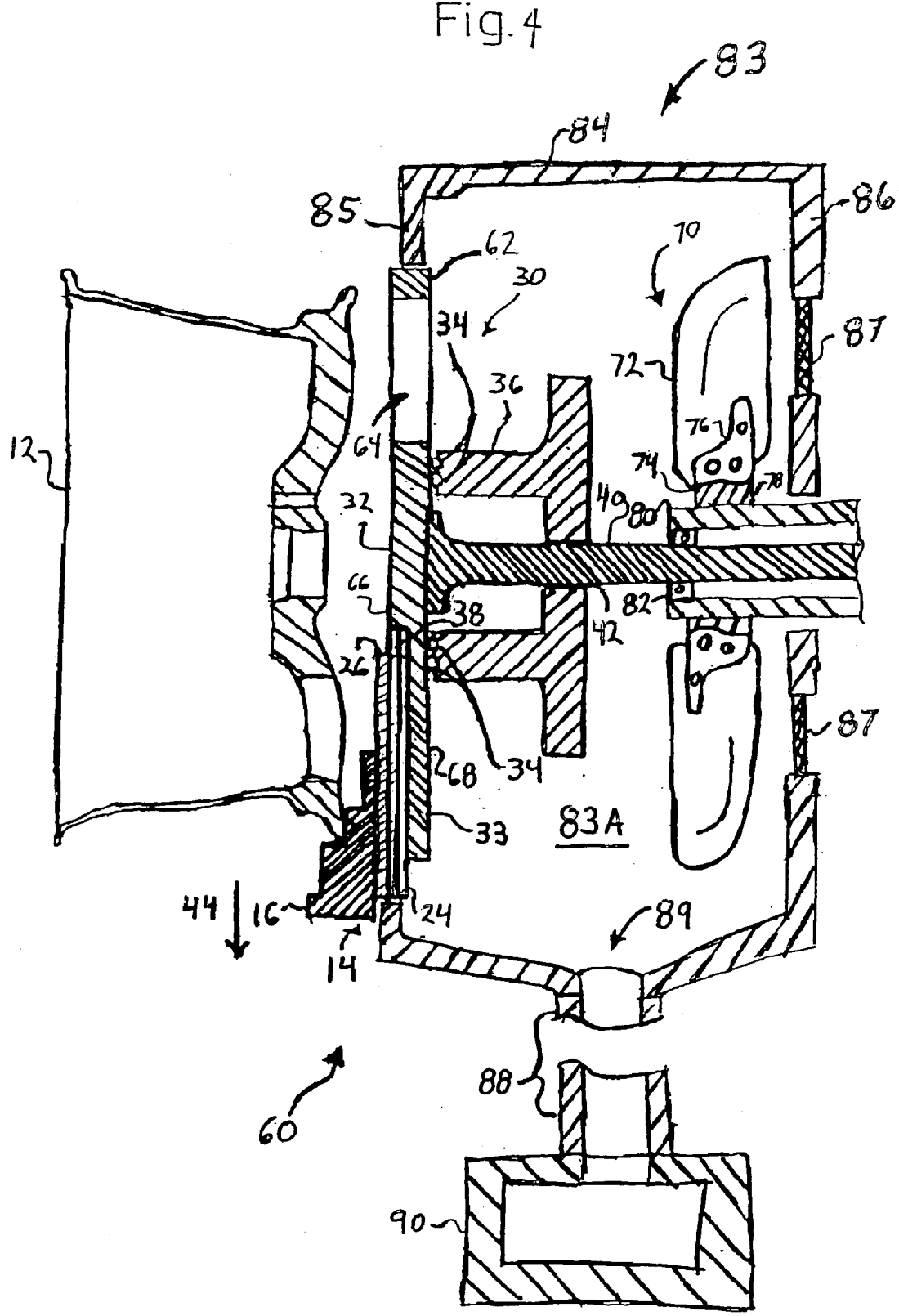
FIG. 4 is a sectional view of the wheel chuck assembly taken along the line 4—4 in FIG. 3.

Referring again to the drawings, there is illustrated, in FIGS. 3 and 4, a wheel chuck assembly 60 in accordance with a first embodiment of the present invention. Components shown in FIGS. 3 and 4 that are similar to components shown in FIGS. 1 and 2 are labeled with the same numerical identifiers. The wheel chuck assembly 60 includes a support plate 62 that is mounted upon the lathe spindle 40 in a manner that is similar to the mounting of the support plate 31, as described above. The support plate 62 has a plurality of wedge shaped apertures 64 formed therethrough. As best seen in FIG. 3, the apertures 64 are formed between adjacent actuator plates 24. In the preferred embodiment, the apertures 64 are sized to remove the maximum amount of material as possible between the actuator plates in order to maximize the size of the apertures. While the chuck assembly 60 is shown having three apertures 64, it will be understood that the invention also may be practiced with more or less apertures. Similarly, while the preferred embodiment has the number of apertures equal to the number of actuator plates carried upon the chuck assembly 60, the invention also may be practiced with one (not shown) or more apertures. Additionally, while the preferred embodiment includes wedge shaped apertures 64, it will be appreciated that the invention also may be practiced utilizing apertures having other shapes, such as, for example, circular, oval, elliptical, rectangular, rhombic or trapezoidal. The purpose of the apertures 64 will be discussed below.

As best shown in FIG. 4, The support plate 62 has a first face 66 and a second face 68. In the same manner described above for the prior art support plate 31, a plurality of jaws 14 are mounted upon the support plate 62. The jaws 14 are operable to move in a radial direction to clamp the vehicle wheel 12 adjacent to the first face 66 of the support plate 62. It must be understood, however, that while the chuck assembly 60 is described as including the plurality of jaws 14, the chuck assembly may alternately include any clamping mechanism, such as a yoke plate/clamp arm arrangement or any other suitable clamping mechanism (not shown).

The chuck assembly 60 includes an air conveying device, that is shown as a fan blade assembly 70 in FIG. 4. The fan blade assembly 70 is mounted adjacent to the support plate second face 68 and includes a plurality of fan blades 72. Each fan blade 72 is secured to a respective fan arm 74 that extends radially from a fan hub 78. The fan hub 78 includes a central aperture that receives a hollow rotatable cylindrical fan shaft 80. The fan hub 78 is secured to the fan shaft 80 by a conventional device. As shown in FIG. 4, the lathe spindle 40 extends axially through the fan shaft 80, allowing for rotation of the fan blade assembly 70 independently of the lathe spindle 40 rotation. As also shown in FIG. 4, the fan shaft 80 is mounted upon the lathe spindle 40 by a bearing assembly 82 that allows the fan blades 72 to be rotated by an motor (not shown) that is independent of the lathe motor. Alternately, the invention also contemplates driving the fan shaft through set of gears or similar speed changing device by the lathe motor. The fan blade assembly 70 is operable to induce an air flow through the support plate apertures 64, as will be further discussed below.

The chuck assembly 60 further includes a shroud 83 that is mounted adjacent to the support plate second face 68. The shroud 83 includes an annular shroud ring 84. A front end ring 85 is formed upon one end of the shroud ring 84 and extends radially inward toward the edge of the support plate 31. A minimal gap between the end ring 85 and the support plate 31 allows for rotation of the support plate 31 while minimizing air flow therebetween. A back plate 86 extends across the end of the shroud ring 84 opposite from the front end ring 85. The lathe spindle 40 and fan shaft 80 extend through an aperture formed through the center of the back plate 86. Additionally, a plurality of screened vents 87, the purpose of which will be discussed below, are formed through the shroud backplate 86. The shroud 83 co-operates with the support plate 62 to define a shroud cavity 83A. The shroud 83 is operable to direct the air flow induced by the fan blade assembly 70, as will be described below. While the preferred embodiment of the shroud 84 is described above as being annular, it will be appreciated that the shroud also may be formed in other shapes that are not shown. Additionally, while the preferred embodiment of the shroud 83 has been illustrated in FIG. 4 with the inner edge of the end ring 85 adjacent to the perimeter of the support plate 62, it will be appreciated that the invention also may practiced with the end ring 85 extending over the outer edge of the surfaces or the support plate faces 66 and 68 (not shown).

The chuck assembly 60 also includes a chip chute 88 which is shown at the bottom of FIG. 4. The chip chute 88 is attached to the lower part of the shroud 84 and communicates with a chip aperture 89 formed through the shroud ring 84. The lower end of the chip chute 88 terminates in a chip hopper 90 which, as will be further discussed below, receives metal chips produced during machining of wheels.

The operation of the wheel chuck assembly 70 will now be described. Upon rotation, the fan blade assembly 70 induces an air flow through the support plate apertures 64 and into the shroud cavity 83A. The air flow then exits the shroud cavity 83A through the vents 87. During machining of the wheel 12 metal chips are cut from the wheel 12. The air flow induced by the fan blade assembly 70 is sufficient such that the metal chips are drawn away from the support plate first face 66, through the support plate apertures 64 and into the shroud cavity 83A. As the metal chips pass into the shroud cavity 83A gravity draws the metal chips to the bottom of the shroud 84. The metal chips then pass though the shroud chip aperture 89 and into the chip chute 88. After falling through the chip chute 88, the chips are collected in the chip hopper 90. The screens that extend across the vents 87 prevent any chips from being thrown out of the shroud 83.

Figure 5:
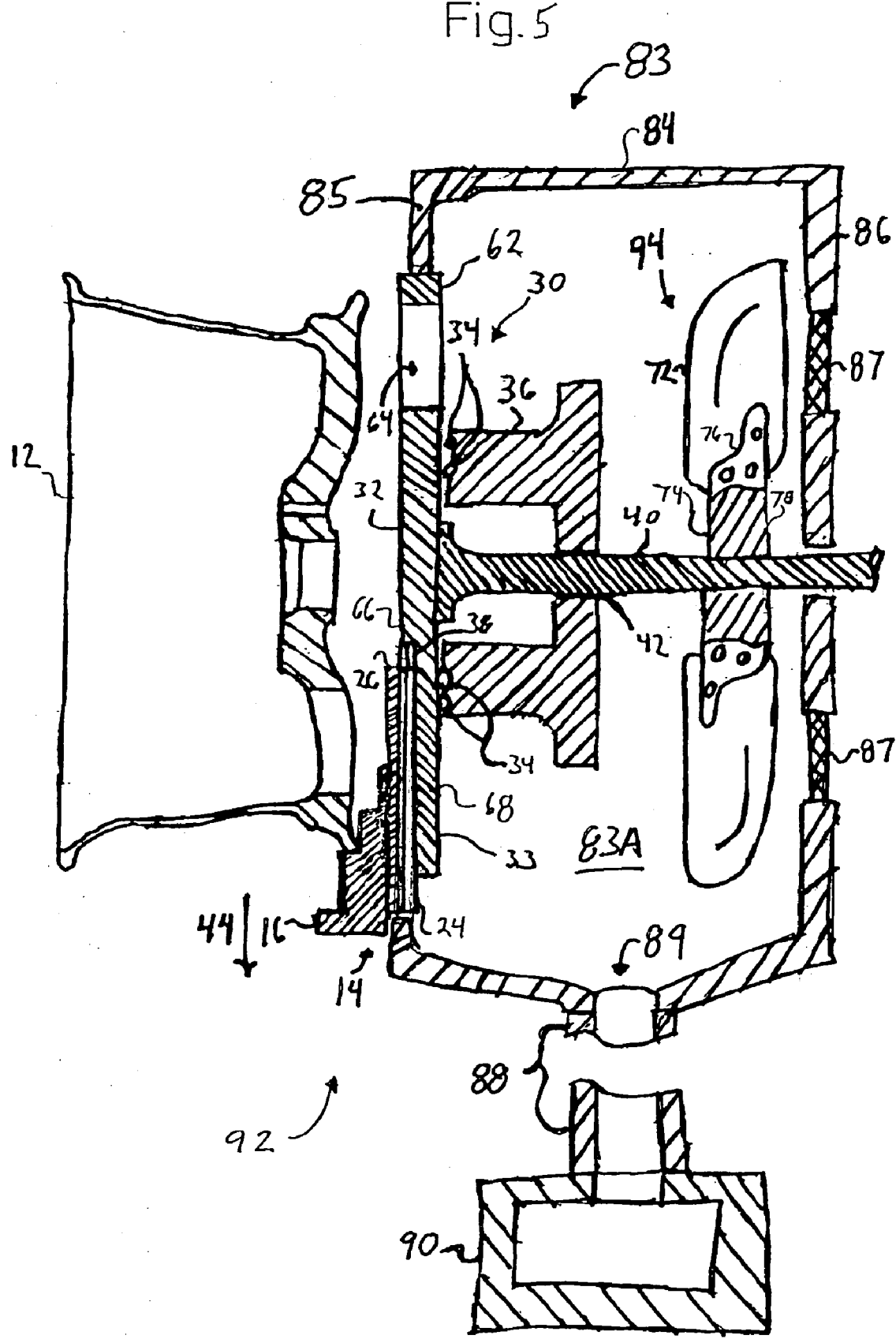
FIG. 5 is a sectional view of an alternate embodiment of the wheel chuck assembly shown in FIG. 4.

An alternate embodiment of the invention 92 is shown in FIG. 5 where components that are similar to components shown in FIG. 4 are labeled with the same numerical identifiers. The wheel chuck assembly 92 includes a fan blade assembly 94 having a hub 78 that is mounted directly upon the lathe spindle 40. Thus, the fan blade assembly 94 rotates with the lathe spindle 40 and does not require an independent drive motor. As described above, the fan blade assembly 94 is operable to induce an air flow through the support plate apertures 64 that is sufficient to draw any metal chips cut from the wheel into the shroud cavity 83A. The chips then fall though the chip chute 88 and into the chip hopper 90.

Figure 6:
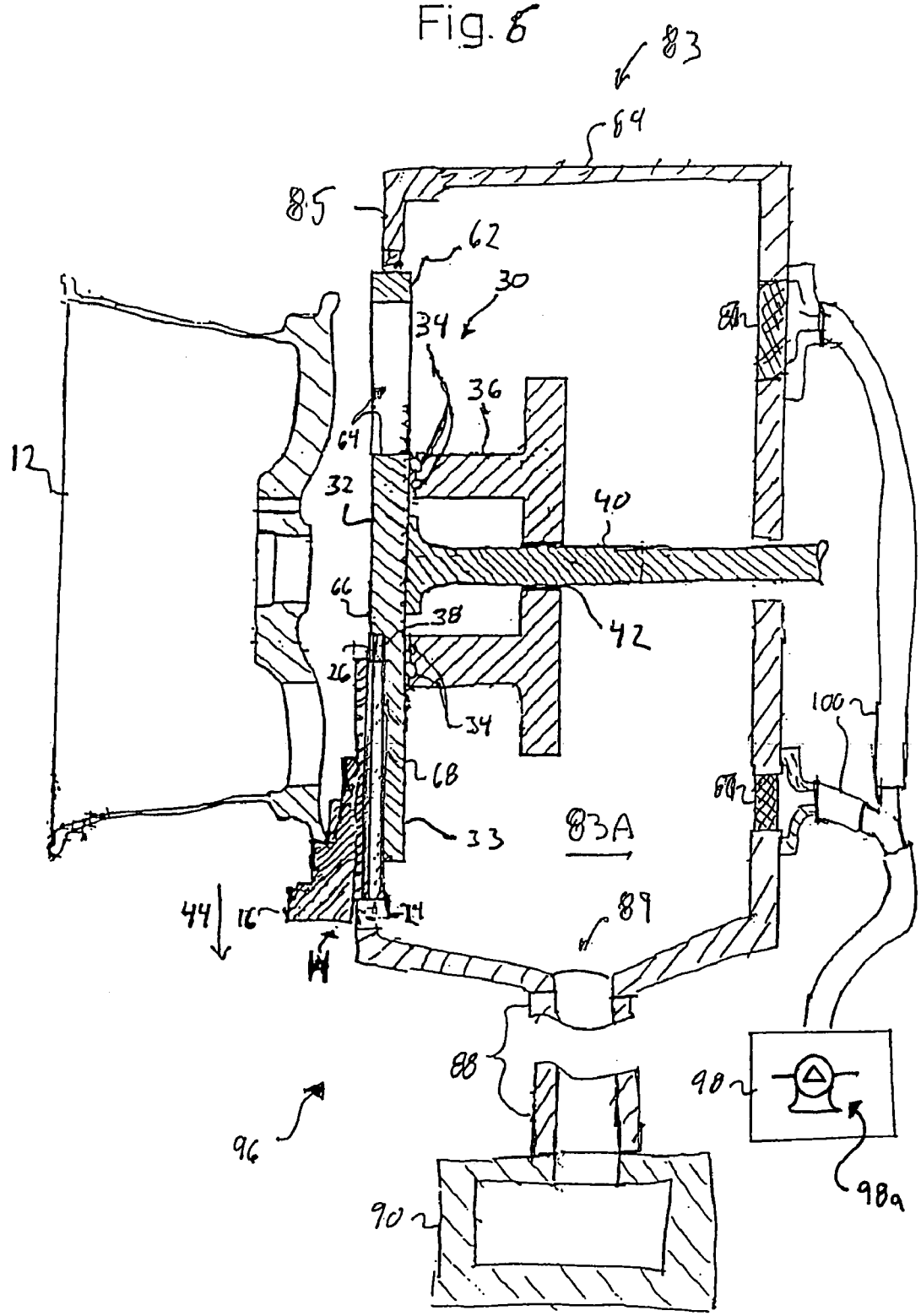
FIG. 6 is a sectional view of another alternate embodiment of the wheel chuck assembly shown in FIG. 4.

Two further alternate embodiments of the invention 96 are shown in FIGS. 6 and 7 where again components that are similar to components shown in FIGS. 4 and 5 are labeled with the same numerical identifiers. The wheel chuck assembly 96 includes an external device 98 for drawing a flow of air through the support plate apertures 64 and into the shroud cavity 83A. In a preferred embodiment, a pump 98a, e.g. air pump, vacuum pump, as shown in FIG. 6 is included for the external air drawing device 98. It will be appreciated that other devices also may be included, such as fan 98a, as shown in FIG. 7. The fan 98a is an external fan, i.e. external to the shroud 84; although such is not required. As shown in FIGS. 6 and 7, the air drawing device 98 is connected by air conduits 100 to the screened vents 87 and is operable to draw sufficient air therethrough to draw any metal chips cut from the wheel into the shroud cavity 83A. The chips then fall though the chip chute 88 and into the chip hopper 90, as described above.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheel chuck assembly comprising:
 a support plate adapted to be mounted upon a lathe spindle, said support plate having a first face and a second face with said second face being opposite from said first face, said support plate also having at least one aperture formed therethrough;
 a clamping mechanism mounted upon said support plate first face, said clamping mechanism operable to clamp a vehicle wheel adjacent said first face of said support plate; and
 an air conveying device mounted adjacent said support plate second face, said air conveying device operable to induce an air flow through said support plate aperture such that metal chips are drawn through said support plate aperture in a direction from said first face toward said second face, whereby chip whip is reduced.

2. The wheel chuck assembly of claim 1 further including a shroud mounted adjacent to said support plate second face, said shroud operable to direct said air flow.

3. The wheel chuck assembly of claim 2 including a plurality of apertures formed through said support plate.

4. The wheel chuck assembly of claim 3 wherein said apertures have a generally wedge shape.

5. The wheel chuck assembly of claim 2 wherein said air conveying device includes a pump communicating with said shroud, said pump operable to induce said air flow.

6. The wheel chuck assembly of claim 5 wherein said shroud includes at least one vent formed therethrough and further wherein said pump is connected to said vent by an air conduit.

7. The wheel chuck assembly of claim 2 wherein said air conveying device includes a fan communicating with said shroud, said fan operable to induce said air flow.

8. The wheel chuck assembly of claim 7 wherein said shroud includes at least one vent formed therethrough and further wherein said fan is connected to said vent by an air conduit.

9. The wheel chuck assembly of claim 2 wherein said air conveying device includes a fan blade assembly mounted within said shroud, said fan blade assembly operable to induce said air flow.

10. The wheel chuck assembly of claim 9 wherein said shroud includes at least one vent formed therethrough such that said air flow exits said shroud.

11. The wheel chuck assembly of claim 9 wherein said fan blade assembly is adapted to be mounted directly upon said lathe spindle for rotation therewith.

12. The wheel chuck assembly of claim 11 further including a chip discharge aperture formed through said shroud such that said metal chips drawn through said support plate apertures are removed from within said shroud.

13. The wheel chuck assembly of claim 12 further including a chip chute having first and second ends and a chip hopper, said first end of said chip chute communicating with said shroud chip discharge aperture and said second end of said chip chute communicating with said chip hopper, said chip chute guiding said chips from said shroud to said chip hopper.

14. The wheel chuck assembly of claim 11 wherein said fan blade assembly is secured to a hollow cylindrical fan shaft that axially receives said lathe spindle such that said fan blade assembly and said lathe spindle are rotated at a different speeds.

15. The wheel chuck assembly of claim 14 further including a chip discharge aperture formed through said shroud such that said metal chips drawn through said support plate apertures are removed from within said shroud.

16. The wheel chuck assembly of claim 15 further including a chip chute having first and second ends and a chip hopper, said first end of said chip chute communicating with said shroud chip discharge aperture and said second end of said chip chute communicating with said chip hopper, said chip chute guiding said chips from said shroud to said chip hopper.

17. The wheel chuck assembly of claim 16 wherein said fan shaft is driven independently of said lathe spindle.

18. The wheel chuck assembly of claim 16 wherein said fan shaft is driven by a motor that also rotates said lathe spindle.

* * * * *